(12) United States Patent
Happel et al.

(10) Patent No.: US 7,959,799 B2
(45) Date of Patent: Jun. 14, 2011

(54) STREET CURB FILTER BASKET SYSTEM

(76) Inventors: Henry Happel, Rockledge, FL (US); Thomas H. Happel, Cocoa, FL (US)

( * ) Notice: Subject to any disclaimer, the term of this patent is extended or adjusted under 35 U.S.C. 154(b) by 0 days.

(21) Appl. No.: 11/061,971

(22) Filed: Feb. 17, 2005

(65) Prior Publication Data

US 2005/0183997 A1   Aug. 25, 2005

(51) Int. Cl.
 *E03F 5/06* (2006.01)
(52) U.S. Cl. ........ 210/163; 210/166; 210/249; 210/908; 404/4
(58) Field of Classification Search .................. 210/163, 210/164, 166
 See application file for complete search history.

(56) References Cited

U.S. PATENT DOCUMENTS

| | | | |
|---|---|---|---|
| 32,008 A * | 4/1861 | Short ............................ 210/163 |
| 540,841 A * | 6/1895 | Palmer .......................... 210/163 |
| 638,691 A * | 12/1899 | Banwell ........................ 210/163 |
| 1,471,819 A * | 10/1923 | Bauschard .................... 210/247 |
| 1,686,415 A * | 10/1928 | Lyes .............................. 210/247 |
| 2,182,795 A * | 12/1939 | Day ............................... 210/164 |
| 3,516,541 A * | 6/1970 | Hardingham ................. 210/164 |
| 5,037,541 A * | 8/1991 | Ruey-Jang et al. ........... 210/141 |
| 5,192,156 A | 3/1993 | Webb |
| 5,223,154 A * | 6/1993 | MacPherson et al. ........ 210/790 |
| 5,232,587 A * | 8/1993 | Hegemier et al. ............ 210/162 |
| 5,284,580 A | 2/1994 | Shyh |
| 5,397,464 A * | 3/1995 | Hannon ........................ 210/163 |
| 5,575,925 A | 11/1996 | Logue, Jr. |
| 5,632,889 A | 5/1997 | Tharp |
| 5,643,445 A | 7/1997 | Billias et al. |
| 5,650,065 A | 7/1997 | Sewell |
| 5,958,226 A * | 9/1999 | Fleischmann ................ 210/165 |
| 6,200,484 B1 * | 3/2001 | McInnis ........................ 210/693 |
| 6,214,216 B1 * | 4/2001 | Isaacson ....................... 210/162 |
| 6,254,770 B1 * | 7/2001 | Remon .......................... 210/163 |
| 6,270,663 B1 | 8/2001 | Happel |
| 6,521,122 B1 * | 2/2003 | Elliot et al. ................... 210/163 |
| 6,602,408 B1 * | 8/2003 | Berkey .......................... 210/170 |
| 6,609,852 B2 * | 8/2003 | Wimberger ..................... 405/40 |
| 6,743,354 B1 * | 6/2004 | Evans et al. ................... 210/164 |
| 6,793,811 B1 * | 9/2004 | Fleischmann ................ 210/163 |
| 6,997,636 B2 * | 2/2006 | Tremouilhac .................... 404/5 |
| D523,537 S * | 6/2006 | Howard ...................... D23/261 |
| 7,132,045 B1 * | 11/2006 | Trangsrud .................... 210/163 |
| 7,163,635 B2 * | 1/2007 | Fitzgerald .................... 210/747 |
| 7,186,333 B2 * | 3/2007 | Kluge ........................... 210/164 |
| 7,309,420 B1 * | 12/2007 | Trangsrud .................... 210/163 |
| 2001/0030150 A1 * | 10/2001 | Remon .......................... 210/163 |
| 2002/0020658 A1 * | 2/2002 | Isaacson ....................... 210/162 |
| 2005/0183997 A1 | 8/2005 | Happel et al. ................ 210/163 |
| 2005/0199537 A1 * | 9/2005 | Kluge ........................... 210/164 |

* cited by examiner

*Primary Examiner* — Robert James Popovics
(74) *Attorney, Agent, or Firm* — William M. Hobby, III

(57) ABSTRACT

A street curb filter apparatus can be attached to a street curb side adjacent a manhole to collect storm water runoff from the curbside and direct the collected storm water through a filter basket. The street curb filter has a street curb shelf with a water channel on the surface thereof and filter basket supporting arms. The filter basket supporting arms are positioned to receive collected storm water runoff from the water channels in the street curb shelf. The filter basket is shaped to fit into a storm water manhole opening and is removably attached to the street curb shelf filter basket arms to receive storm water runoff from the water channeling surface.

9 Claims, 1 Drawing Sheet

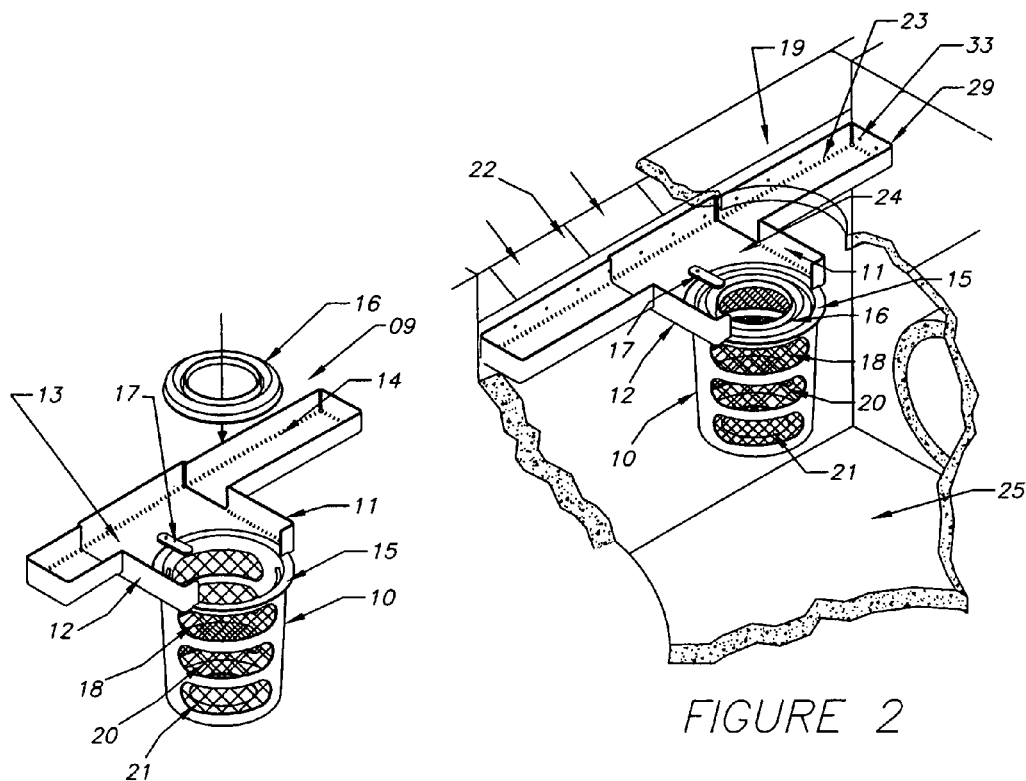
FIGURE 1
FIGURE 2
FIGURE 1-A
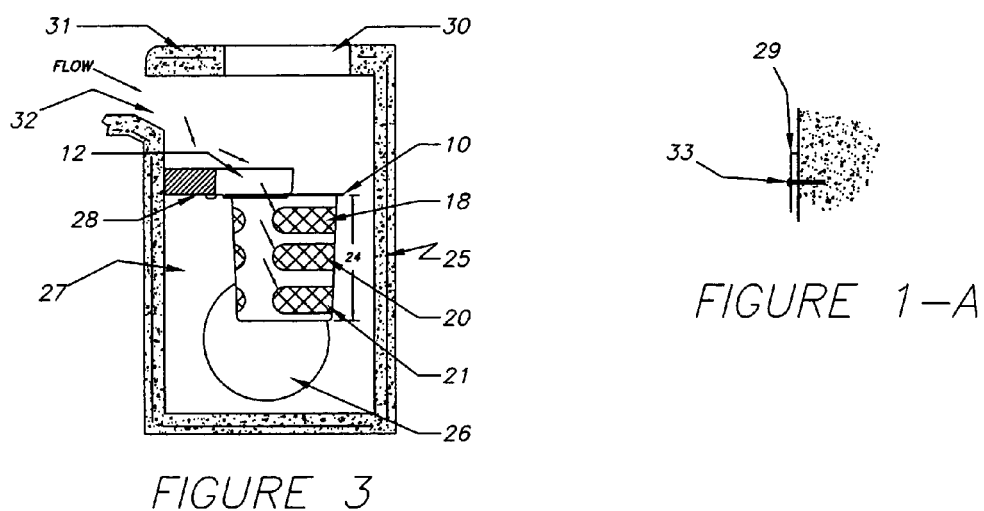
FIGURE 3

STREET CURB FILTER BASKET SYSTEM

BACKGROUND OF THE INVENTION

This application relates to a curb inlet system having a removable basket at the end of the curb inlet flume and to a removable basket filter which collects entering storm water and filters out hydrocarbons, sand and debris, from the storm water.

Ground water from heavy rains or melted snow is collected in storm sewer catch basins and flows into an underground storm drain or sewer line. The water flows into the basin through openings in a grate placed on top of the basin to prevent larger solids from entering the basin. Conventional storm sewer filters remove solids from the water before the water flows into the catch basin. These filters are sometimes made of a porous material and located at or above grade level. Filters may be placed horizontally on top of the grate or may be positioned vertically in a circle above grade level surrounding the grate. Water flows through the filter and into the catch basin while solids are captured by the filter. Over time, the solids build up on the filter and impede the free-flow of water through the filter and the collected water floods the area surrounding the storm sewer. Conventional ground storm sewer filters located at or above grade level are readily visible.

One prior art U.S. patent for a storm sewer filter can be seen in the Logue, Jr. U.S. Pat. No. 5,575,925, for a storm sewer catch basin and filter having a removable filter for buried catch basins. The filter includes a bag located below grade level in the catch basin and looped flaps which extend above grade level to aid in the removal of the filter from the catch basin. The filter is held in place in the basin by a heavy grate which rests on top of the flaps. In the Webb U.S. Pat. No. 5,192,156, a drain apparatus for a liquid trap is provided for placement in the opening for catching a runoff liquid from a surface into a sewer through a passageway extending between the surface and the sewer and for forming a liquid barrier between the sewer and the surface to prevent the flow of gases from the sewer to the surface. The Shyh U.S. Pat. No. 5,284,580, is a refuge collecting frame for a drainage sewer which is placed beneath a cover of a sewer drainage opening to accumulate refuge and permit easy disposable of the refuge accumulated therein to prevent blockage of the sewer. The frame body is a rectangular frame structure having dimensions corresponding to the opening of a sewer drain and has a filtering net or porous board with a plurality of holes therein incorporated into each side and bottom of the frame. The Tharp U.S. Pat. No. 5,632,889, is a filter cartridge for separating liquid hydrocarbons from water. A cartridge is formed from perlite particles which have been expanded and treated. The cartridge is mounted and removed from a catch basin opening. The Sewell U.S. Pat. No. 5,650,065, is a skimmer cover for a dry well in a catch basin for placing in an opening in a storm water catch basin to prevent floatable materials, such as hydrocarbons from a motor vehicle, from entering the catch basin. The Billias et al. U.S. Pat. No. 5,643,445, is a removable storm water screen and overflow device which includes a debris removing screen basket and overflow apparatus for use in a storm collection sewer and includes a central panel with foldable wings in each side of the central panel and in which each wing can have an optional extension panel slidably attached to each wing by bolts and nuts through longitudinal slots.

My U.S. Pat. No. 6,270,663 is directed towards a storm drain filter system which is placed beneath the grate of the entrance to a storm water catch basin and especially to a filter system which collects the entering storm water and filters out hydrocarbons, such as automobile oil, sand and debris, such as grass clippings, from the storm water to provide a much cleaner water to the storm pipe by passing the drainage water onto an oil filter boom and then into a container having fine screen filtered outlets in the bottom and coarser screen filters on the sides and having overflow openings near the top of the container.

SUMMARY OF THE INVENTION

A street curb filter apparatus can be attached to a street curb side adjacent a manhole to collect storm water runoff from the curbside and direct the collected storm water through a filter basket. The street curb filter has a street curb shelf with a water channel on the surface thereof and filter basket supporting arms. The filter basket supporting arms are positioned to receive collected storm water runoff from the water channels in the street curb shelf. The filter basket is shaped to fit into a storm water manhole opening and is removably attached to the street curb shelf filter basket arms to receive storm water runoff from the water channeling surface. The filter basket includes a supporting rim around the top portion for supporting the filter basket in the supporting arms and there is a removably hydrocarbon filter boom attached around the rim thereof for collecting hydrocarbons passing thereover into the filter basket. There is also a locking member for locking the filter basket in place between the arms. The filter basket has a plurality of filter screens therein with finer screens being positioned in the bottom of the filter basket and courser screens located around the top portion of the filter basket. The street curb shelf can be made of fiberglass material and adjusted for different manhole openings and has a lip for attaching the shelf with supporting pins attached through the lip into the concrete edge of a street curb.

BRIEF DESCRIPTION OF THE DRAWINGS

Other objects, features, and advantages of the present invention will be apparent from the written description and the drawings in which:

FIG. 1 is a perspective view of a curb inlet basket system attached to a curb in accordance with the present invention;

FIG. 1A is a partial sectional view of the flume attaching lip attached to a catch basin wall;

FIG. 2 is a perspective view of a filter basket system in accordance with the present invention attached into a street curb; and FIG. 3 is a sectional view taken through a manhole having the basket mounted therein to capture the flow from the street.

DESCRIPTION OF THE PREFERRED EMBODIMENTS

Referring to FIG. 1, a filter basket system 9 is attached to the inside of a concrete catch basin and has a generally cylindrical filter basket 10 removably attached thereto on a pair of supporting arms 11 and 12. Arms 11 and 12 extend from a flume inlet portion 13 which feeds storm water from an inlet flume shelf 14 attached adjacent to a street curb. The storm water is fed from a street down the flume shelf 14 into the filter inlet 13 and into the filtration basket 10 and into a concrete catch basin. The supporting rim 15 of the filtration basket 10 is sized to be just slightly smaller than the entrance to the manhole so that the basket can be easily removed from the top through the manhole for emptying and cleaning without having to enter the manhole. The filter basket has a removable hydrocarbon capturing boom 16 which mounts directly to the filtration basket and has a rotating clip 17 which rotates to lock the filtration basket 10 in place. Filtration basket 10 has a plurality of screens including a courser screen 18 followed by either the same size or finer screens 20 and 21 and may also have a screen on the bottom of the basket as desired for filtering water entering into the filtration basket 10.

FIG. 1A is a sectional view of the attaching lip 29 for attaching the filter basket shelf to a concrete wall with drive pins 33.

In FIG. 2, a filter basket system 19 has the filtration basket 10 having the removable boom 16 mounted therein and supported by the arms 11 and 12. The basket 10 is locked in place with the rotating tab lock 17. A street curb flume 22 feeds storm water into an inlet flume or channel shelf 23 which then feeds into the basket inlet area 24 where it feeds into the filtration basket 10 over the removable oil filter boom 16. The water passing through the filtration basket 10 flows into the concrete catch basin 25 and out the storm drain line 26. The filter basket 10 can be easily cleaned since it is removably mounted to the system 19 directly under a manhole opening and is sized to be lifted from the manhole through the manhole opening and then emptied or cleaned and replaced without a worker having to get into the manhole. It may also be rapidly cleaned with a vacuum truck by simply placing the vacuum hose through the manhole entrance and into the filtration basket 10. Since the filtration basket is a generally cylindrical shape, greater strength is provided to the basket which also is shaped to allow the basket to be quickly removed from the manhole through the manhole cover and which is shaped to allow a vacuum hose running from a vacuum truck to be easily inserted into the basket for cleaning the basket in-situ.

FIG. 3 illustrates the filtration basket 10 removably mounted in a concrete catch basin 27 with the arms 12 extending from the storm water collecting shelf 28. The concrete catch basin 27 has a manhole 30 which would typically have a manhole cover thereover extending in from a sidewalk or street surface 31 having a curb inlet 32 feeding the water directly into the manhole to a catch flume and onto the basket inlet 28 and through the filtration basket 10. The removable generally cylindrical filtration basket 10 catches everything passing into the storm drain and can be easily removed through the manhole opening 30 without entry into the manhole.

The shelf or flume 14 or 23, seen in FIGS. 1 and 2, provides entire coverage of the inlet openings so as to divert all storm water flow to the basket 10. The shelf system may be made from a marine grade fiberglass which is gel coated for UV protection. The shelf system is attached to the catch basin with non-corrosive hardware as seen in FIG. 1A. The filtration basket 10 may be manufactured of marine grade fiberglass which is also gel coated for UV protection and may have fine screen and course containment screen manufactured from stainless steel. The filtration basket may hold a boom of absorbent media 16 mounted around the lip of the filtration basket 10 to capture hydrocarbons being fed through the storm water system. The boom is easily replaced without removing the mounting hardware. As seen from the drawings, the shelf size and position can be varied to keep the basket 10 directly under the manhole 30 for easy cleaning using a vacuum truck and for easy removal as desired. The position of the manhole determines the location of the basket and also the length and positioning of the arms 11 and 12. The filtration basket 10 will typically be about an inch smaller than the manhole 30 opening and the filtration basket will vary in size to match this opening.

It should be clear at this time that a high capacity round grate inlet skimmer box system has been disclosed which is used directly under a manhole and which can be easily cleaned with a vacuum truck or removed and replaced as desired and which has a hydrocarbon capturing boom mounted thereto. However, it will also be clear that the present invention is not to be limited to the forms shown which are to be considered illustrative rather than restrictive.

We claim:

1. A street curb filter comprising:
   a street curb shelf attachable to a street curb adjacent a manhole entrance for capturing storm water from said street, said street curb shelf having a water channeling surface thereon and having a filter basket supporting portion having a pair of support arms, said filter basket supporting portion being positioned to receive collected storm water runoff from said channeling surface;
   a filter basket shaped to fit into a storm water manhole opening and being removably supported by said street curb shelf filter basket supporting portion pair of arms for receiving storm water runoff from said water channeling surface;
   whereby said street curb filter can be attached to a street curbside adjacent a manhole to collect storm water from said curbside and direct the collected storm water into said filter basket.

2. A street curb filter in accordance with claim 1 in which said filter basket has a top and bottom portion and has a supporting rim around the top portion for supporting said filter basket in said pair of arms.

3. A street curb filter in accordance with claim 2 in which said filter basket has a removable hydrocarbon boom attached around the rim thereof for removing hydrocarbons in said storm water runoff passing over said hydrocarbon boom.

4. A street curb filter in accordance with claim 3 in which said filter basket supporting portion includes a filter basket locking member for locking said filter basket in place between said pair of arms.

5. A street curb filter in accordance with claim 4 in which said filter basket is generally cylindrically shaped.

6. A street curb filter in accordance with claim 5 in which said filter basket has a plurality of screens therein with said screens in the bottom portion of said filter basket being finer screens relative to courser screens in the top portion of said filter basket.

7. A street curb filter in accordance with claim 6 in which said street curb shelf is made of a fiberglass material.

8. A street curb filter in accordance with claim 7 in which said filter basket screens are made of stainless steel.

9. A street curb filter in accordance with claim 8 in which said street curb shelf has multiple sections which can be positioned for differently shaped manholes.

* * * * *